US007935301B2

(12) United States Patent
Hofmeister et al.

(10) Patent No.: US 7,935,301 B2
(45) Date of Patent: May 3, 2011

(54) METHOD OF THERMOFORMING

(75) Inventors: Frank M. Hofmeister, Mauldin, SC (US); Bobby Ayers, Greenville, SC (US); Nathaneal R. Miranda, Spartanburg, SC (US); Cindy T. Price, Wellford, SC (US)

(73) Assignee: Cryovac, Inc., Duncan, SC (US)

( * ) Notice: Subject to any disclaimer, the term of this patent is extended or adjusted under 35 U.S.C. 154(b) by 1282 days.

(21) Appl. No.: 11/194,303

(22) Filed: Aug. 1, 2005

(65) Prior Publication Data
US 2007/0026250 A1 Feb. 1, 2007

(51) Int. Cl.
*B29C 51/00* (2006.01)
*B29C 51/08* (2006.01)
*B29C 51/14* (2006.01)
*B32B 27/00* (2006.01)
*B32B 27/34* (2006.01)

(52) U.S. Cl. ............... 264/553; 264/544; 428/474.4; 428/475.8; 428/476.1; 428/476.3

(58) Field of Classification Search ............... 428/474.4, 428/515, 523, 475.8, 476.1, 476.3; 264/45.1, 264/45.9
See application file for complete search history.

(56) References Cited

U.S. PATENT DOCUMENTS

| | | | |
|---|---|---|---|
| 4,207,363 A | 6/1980 | Lustig et al. | |
| 4,469,742 A | 9/1984 | Oberle et al. | |
| 4,511,610 A | 4/1985 | Yazaki et al. | |
| 4,532,189 A | 7/1985 | Mueller | |
| 4,599,276 A | 7/1986 | Martini | |
| 4,640,852 A | 2/1987 | Ossian | |
| 4,640,856 A | 2/1987 | Ferguson et al. | |
| 4,735,855 A | 4/1988 | Wofford et al. | |
| 4,746,562 A | 5/1988 | Fant | |
| 4,755,419 A | 7/1988 | Shah | |
| 4,801,486 A * | 1/1989 | Quacquarella et al. ...... | 428/34.9 |
| 4,965,136 A | 10/1990 | Mueller | |
| 5,035,955 A | 7/1991 | Matsukura et al. | |
| 5,051,481 A | 9/1991 | Taka et al. | |
| 5,055,355 A | 10/1991 | DeAntonis et al. | |
| 5,097,955 A | 3/1992 | Kluter et al. | |
| 5,306,745 A | 4/1994 | Herran et al. | |
| 5,350,622 A | 9/1994 | Speer et al. | |
| 5,358,792 A | 10/1994 | Mehta et al. | |
| 5,482,770 A | 1/1996 | Bekele | |
| 5,529,833 A | 6/1996 | Speer et al. | |
| 5,677,044 A | 10/1997 | Beccarini et al. | |
| 5,707,751 A | 1/1998 | Garza et al. | |
| 5,721,314 A * | 2/1998 | Hausmann ...................... | 525/71 |
| 5,837,335 A | 11/1998 | Babrowicz | |
| 5,916,613 A | 6/1999 | Stockley, III | |
| 5,919,547 A | 7/1999 | Kocher et al. | |
| 6,033,758 A | 3/2000 | Kocher et al. | |
| 6,068,933 A | 5/2000 | Shepard et al. | |
| 6,094,889 A | 8/2000 | Van Loon et al. | |
| 6,203,750 B1 | 3/2001 | Ahlgren et al. | |
| 6,221,410 B1 | 4/2001 | Ramesh et al. | |
| 6,274,228 B1 | 8/2001 | Ramesh et al. | |
| 6,287,613 B1 | 9/2001 | Childress et al. | |
| 6,291,041 B1 | 9/2001 | Howells et al. | |
| 6,296,886 B1 | 10/2001 | DePoorter et al. | |
| 6,503,637 B1 | 1/2003 | Van Loon | |
| 6,534,580 B1 | 3/2003 | Hanada et al. | |
| 6,562,476 B2 | 5/2003 | Shepard et al. | |
| 6,582,828 B1 | 6/2003 | Kaschel | |
| 6,599,639 B2 | 7/2003 | Dayrit et al. | |
| 6,624,247 B2 | 9/2003 | Kume et al. | |
| 6,645,641 B2 | 11/2003 | Eckstein et al. | |
| 6,682,825 B1 | 1/2004 | Kennedy et al. | |
| 6,727,000 B2 | 4/2004 | July et al. | |
| 6,764,729 B2 | 7/2004 | Ramesh et al. | |
| 6,787,220 B2 | 9/2004 | Wallace et al. | |
| 6,790,468 B1 | 9/2004 | Mize, Jr. et al. | |
| 6,861,125 B1 | 3/2005 | Carlson et al. | |
| 6,861,127 B2 | 3/2005 | Glawe et al. | |
| 2001/0008660 A1 | 7/2001 | Stall et al. | |
| 2001/0046606 A1 | 11/2001 | Tau et al. | |
| 2003/0129434 A1 * | 7/2003 | Glawe et al. ................... | 428/515 |
| 2003/0203230 A1 * | 10/2003 | Pellingra et al. ............... | 428/515 |
| 2004/0013862 A1 * | 1/2004 | Brebion et al. ................ | 428/212 |
| 2004/0048080 A1 * | 3/2004 | Schell et al. ................ | 428/474.4 |
| 2004/0048086 A1 | 3/2004 | Kennedy et al. | |
| 2004/0058092 A1 * | 3/2004 | Sameuls et al. ................ | 428/1.1 |
| 2004/0170851 A1 | 9/2004 | Lischefski | |

FOREIGN PATENT DOCUMENTS

| | | |
|---|---|---|
| EP | 0 145 014 | 6/1985 |
| EP | 0 203 727 | 3/1986 |
| EP | 0 236 099 | 9/1987 |
| EP | 0 269 350 | 6/1988 |
| EP | 0 600 246 | 8/1994 |
| EP | 0 663 422 B1 | 7/1995 |
| EP | 0 686 497 A2 | 12/1995 |
| EP | 1 095 765 A2 | 5/2001 |
| EP | 1 270 651 A1 | 1/2003 |
| EP | 1 332 868 B1 | 4/2005 |
| WO | 00/02961 | 1/2000 |
| WO | 01/03922 A1 | 1/2001 |
| WO | 01/70500 A1 | 9/2001 |
| WO | 03/040202 A2 | 5/2003 |
| WO | 2004/009353 A2 | 1/2004 |

OTHER PUBLICATIONS

Dow Plastics, Product Information Bulletin, DP 3000.00 Developmental Performance Plastomer (Jan. 2004).
Dow Plastics, Product Information Bulletin, DP 3200.00 Developmental Performance Plastomer (Jan. 2004).
Dow Plastics, Product Information Bulletin, DE 3300.00 Developmental Performance Plastomer (Dec. 2003).
Dow Information Bulletin, "Dow Commercializes first plant for Versify plastomers and elastomers" (Oct. 18, 2004).

(Continued)

*Primary Examiner* — Khanh Nguyen
*Assistant Examiner* — Carson Gross
(74) *Attorney, Agent, or Firm* — Daniel B. Ruble

(57) ABSTRACT

A method of thermoforming comprises the steps of providing a film, heating the film, and forming the heated film onto a mold. The film comprises a propylene/ethylene copolymer skin layer having a melting point of from about 130° C. to about 150° C. and a interior polyamide layer having a melting point of from about 125° C. to about 230° C.

65 Claims, No Drawings

OTHER PUBLICATIONS

Dow Corporate Press Release, Versify Plastomers and Elastomers, "Dow Unveils Versify Plastomers and Elastomers—new technology generates unique performance combinations," (Oct. 12, 2004).

K.W. Swogger et al, "Material Classification and Applications of New Propylene-Ethylene Copolymers," 61$^{st}$ Annual Technical Conference ANTEC 2003, Conference Proceedings v2 2003, p. 1768-1774 (May 4-8, 2003).

Dow Corporate Press Release, Versify Plastomers and Elastomers, Fact Sheet (Oct. 12, 2004).

Dow Publication, Packed with Performance vol. 8 Issue 1, Versify Plastomers and Elastomers New resins offering exciting performance combinations (Jun. 2004).

Dow Publication, Versify Plastomers and Elastomers, "Opening Minds and Markets" Sections "About," "Product Information," "Market Segments, including Food and Specialty Packaging . . . , Rigid Packaging . . . , Thermoplastic Elastomers . . . , Consumer Products . . . " "Fabrication Process," "Press Corner, including 'Dow unveils Versify . . . (Feb. 12, 2004),' 'Dow Exhibiting at K2004 . . . (Apr. 21, 2004),' 'Groundbreaking technology to feature at K2004 . . . (Sep. 10, 2004),' 'Dow Opens First Commercial Plant for Versify . . . (Sep. 16, 2004),'and Dow Launches Advanced Resins . . . (Oct. 5, 2004)," and "Explore the Possibilities" printed Mar. 21, 2005 from http://www.dow.com/versify/index.htm.

Basell Polyolefins Product Data Sheet, Clyrell SM1340 (Aug. 10, 2004).

Sealed Air / Cryovac, Food Packaging Systems Brochure, "New Path" (Jan. 2003), which mentions the T-series forming web on p. 5; the T-series film is described in the Application, p. 1, lines 8-17).

\* cited by examiner

METHOD OF THERMOFORMING

BACKGROUND OF THE INVENTION

The present invention relates to thermoforming processes and thermoformable films and webs useful in such processes.

An existing forming web used in thermoforming processes is commercially available from Cryovac under the T-series designation. The forming web has the following layer configuration:

skin/intermediate/tie1/polyamide/barrier/polyamide/tie2/bulk/sealant, where the skin layer is a heterogeneous homo-polypropylene, the intermediate layer is a heterogeneous random propylene/ethylene copolymer, the tie1 layer is a maleic anhydride grafted homo-polypropylene, the polyamide layers are nylon-6, the barrier layer is ethylene/vinyl alcohol copolymer, the tie2 layer is a maleic anhydride grafted linear low density polyethylene, the bulk layer is a homogenous linear low density polyethylene with a minor amount of low density polyethylene, and the sealant layer is a homogeneous very low density polyethylene.

A desirable attribute of formability is that the forming web conforms to the thermoform mold to form a distinct pocket that does not "bridge" the corners of the mold (i.e., non-conform to the mold corners) to an undesired extent. Although the forming web mentioned above performs well under many conditions of thermoforming use, it may be advantageous to provide an improved forming web capable of use with thermoforming equipment where a broad thermoforming temperature window is desired, while also maintaining good formability to the thermoforming mold within this broad thermoforming temperature window. It is also desirable that the forming web achieve the broader thermoforming temperature window while displaying superior optical attributes.

SUMMARY OF THE INVENTION

The present invention may address one or more of the aforementioned problems. One embodiment of the invention is a method of thermoforming that comprises the steps of providing a film, heating the film, and forming the heated film onto a mold. The provided film comprises a skin layer and a first polyamide layer. The skin layer forms an outer surface of the film, has a melting point of at least about 130° C. and at most about 150° C., and comprises one or more propylene/ethylene copolymers. The first polyamide layer forms an interior layer of the film, has a melting point of at least about 125° C. and at most about 230° C., and comprises one or more polyamides.

In another embodiment of the invention, a thermoformable film comprises a skin layer, a first polyamide layer, an intermediate layer, a barrier layer, and a second polyamide layer. The skin layer comprises at least about 50%, by weight of the layer, of one or more propylene/ethylene copolymers having a melting point of at least about 130° C. and at most about 150° C. The first polyamide layer comprises at least about 50%, by weight of the layer, of one or more polyamides having a melting point of at least about 125° C. and at most about 230° C. The intermediate layer is between the skin layer and the first polyamide layer and is directly adjacent the skin layer. The intermediate layer comprises at least about 50%, by weight of the layer, of one or more homogenous propylene/ethylene copolymers having a melting point of at least about 105° C. and at most about 150° C. The barrier layer is directly adjacent the first polyamide layer. The barrier layer comprises ethylene/vinyl alcohol copolymer. The second polyamide layer is directly adjacent the barrier layer. The second polyamide layer comprises at least about 50%, by weight of the layer, of one or more polyamides having a melting point of at least about 125° C. and at most about 230° C.

These and other objects, advantages, and features of the invention will be more readily understood and appreciated by reference to the detailed description of the invention and the drawings.

DETAILED DESCRIPTION OF THE INVENTION

A method of thermoforming comprises the steps of providing a film, followed by heating the film, and then forming the heated film in a mold.

Film

A film useful for thermoforming may include one or more of the following layers: a skin layer, an intermediate layer, a first polyamide layer, a barrier layer, a second polyamide layer, a sealant layer, tie layers, and a bulk layer. These layers are discussed below.

The film may have a total thickness of at least about, and/or at most about, any of the following: 1, 2, 3, 4, 5, 7, 9, 10, 12, and 15 mils.

The film may comprise at least, and/or at most, any of the following numbers of layers: 2, 3, 4, 5, 6, 7, 8, 9, 10, 11, 13, and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application.

Below are some examples of combinations in which the alphabetical symbols designate the film layers. Where the multilayer film representation below includes the same letter more than once, each occurrence of the letter may represent the same composition or a different composition within the class that performs a similar function.

A/D, A/D/C, A/D/C/D, A/D/D, A/D/F, A/D/C/F, A/D/C/D/F, A/D/D/F, A/E/D, A/E/D/C, A/E/D/C/D, A/E/D/D, A/E/D/F, A/E/D/C/F, A/E/D/C/D/F, A/E/D/D/F, A/E/D/E/F, A/E/D/C/E/F, A/E/D/C/D/E/F, A/E/D/D/E/F, A/B/D, A/B/D/C, A/B/D/C/D, A/B/D/D, A/B/D/F, A/B/D/C/F, A/B/D/C/D/F, A/B/D/D/F, A/B/E/D, A/B/E/D/C, A/B/E/D/C/D, A/B/E/D/D, A/B/E/D/F, A/B/E/D/E/F, A/B/E/D/C/F, A/B/E/D/C/E/F, A/B/E/D/C/D/F, A/B/E/D/D/F, A/B/D/C/D/E/F, A/B/E/D/C/D/E/F, A/D/G/F, A/D/C/G/F, A/D/C/D/G/F, A/D/D/G/F, A/E/D/G/F, A/E/D/C/G/F, A/E/D/C/D/G/F, A/E/D/D/G/F, A/E/D/E/G/F, A/E/D/C/E/G/F, A/E/D/C/D/E/G/F, A/E/D/D/E/G/F, A/B/D/G/F, A/B/D/C/G/F, A/B/D/C/D/G/F, A/B/D/D/G/F, A/B/E/D, A/B/E/D/C, A/B/E/D/C/D, A/B/E/D/D, A/B/E/D/G/F, A/B/E/D/E/G/F, A/B/E/D/C/G/F, A/B/E/D/C/D/G/F, A/B/E/D/D/G/F, A/B/D/C/D/E/G/F, A/B/E/D/C/D/E/G/F, A/B/E/D/E/G/F, A/B/E/D/D/E/G/F

"A" represents a skin layer, as discussed below.
"B" represents an intermediate layer, as discussed below.
"C" represents a barrier layer, as discussed below.
"D" represents a first or second polyamide layer, as discussed below.
"E" represents a tie layer, as discussed below.
"F" represents a sealant layer, as discussed below.
"G" represents a bulk layer, as discussed below.

The film may have an oxygen transmission rate—measured at a time selected from before the forming step and/or after the forming step—of at most about, and/or at least about, any of the following values: 20,000; 10,000; 1,000; 500; 400; 300; 200; 150; 100; 50; 45; 40; 35; 30; 25; 20; 15; 10; 5; and 1 cubic centimeters (at standard temperature and pressure) per square meter per day per 1 atmosphere of oxygen pressure differential measured at 0% relative humidity and 23° C. Unless otherwise noted, all references to oxygen transmission rate in this application are measured at these conditions according to ASTM D-3985. The barrier layer may have a thickness and composition sufficient to impart to the film incorporating the barrier layer any of the oxygen transmission rates listed above.

Skin Layer

The film comprises a skin layer forming an outer surface of the film. The skin layer may comprise one or more propylene/ethylene copolymers ("PEC"), which are copolymers of propylene and ethylene having a majority weight % content of propylene. Useful PEC may have an ethylene content of at least about, and/or at most about, any of the following: 2, 3, 4, 5, 6, 8, 10, 12, and 15 weight percent. Useful PEC may have a density of at least about, and/or at most about, any of the following: 0.900, 0.092, and 0.905 g/cc. Useful PEC for the skin layer may have a melting point of at least about, and/or at most about, any of the following: 130, 135, 140, 145, and 150° C.

The PEC in a layer may comprise at least about, and/or at most about, 80%, 90%, 95%, and 100% random PEC, based on the total weight of PEC in a layer. The PEC may be selected from heterogeneous PEC or homogeneous PEC. Heterogeneous polymers have a relatively wide variation in molecular weight and composition distribution. Heterogeneous polymers may be prepared with, for example, conventional Ziegler-Natta catalysts. On the other hand, homogeneous polymers have relatively narrow molecular weight and composition distributions, and are typically prepared using single-site catalysts such as metallocene. The distinction between heterogeneous and homogenous polymers are discussed below in more detail. Exemplary heterogeneous and homogenous PECs are described or characterized below in the Intermediate Layer section.

The skin layer may comprise one or more of any of the PECs described or characterized in this Application in at least about, and/or at most about, any of the following amounts: 30, 40, 45, 50, 55, 60, 65, 70, 75, 80, 85, 90, 95, and 100% by weight of the layer. The skin layer may consist essentially of, or may consist of, one or more propylene/ethylene copolymers.

The skin layer may have a thickness of at least about, and/or at most about, any of the following: 0.05, 0.1, 0.15, 0.2, 0.25, 0.5, 1, 2, 3, 4, and 5 mils. The thickness of the skin layer may range as a percentage of the total thickness of the film of from at least about, and/or at most about, any of the following: 1, 3, 5, 7, 10, 15, 20, 25, 30, 35, 40, 45, and 50 percent.

The skin layer may have a melting point (i.e., melting temperature) of at least about, and/or at most about, any of the following: 130, 135, 140, 145, and 150° C. All references to the melting point or melting temperature of a polymer, a resin, or a film layer in this application refer to the melting peak temperature of the dominant melting phase of the polymer, resin, or layer as determined by differential scanning calorimetry according to ASTM D-3418.

Intermediate Layer

The film may comprise an intermediate layer. The intermediate layer is between the skin layer and the first polyamide layer. The intermediate layer may be directly adjacent the skin layer, so that there is no intervening layer between the intermediate and skin layers.

The intermediate layer may include one or more PECs, such as those having an ethylene monomer content of at least about, and/or at most about, any of the following: 1, 1.5, 2, 3, 4, 5, 6, 8, 10, 12, 13, 13.5, 14, and 15 weight percent. Useful PEC may have a density of at least about, and/or at most about, any of the following: 0.860, 0.870, 0.875, 0.880, 0.885, 0.900, and 0.905 g/cc. Useful PEC for the intermediate layer may have a melting point of at least about, and/or at most about, any of the following: 85, 90, 95, 100, 105, 110, 115, 120, 125, 130, 135, 140, and 150° C.

The intermediate layer may comprise one or more PECs selected from heterogeneous PEC and homogeneous PEC. The intermediate layer may comprise random PEC.

Exemplary heterogeneous PEC includes those available from ExxonMobil under the ESCORENE PP-9012.E1 trade name (believed to have a density of 0.902 g/cc, a melting temperature of 144° C., and an ethylene comonomer content of 2.8 wt. %), and from Basell under the SHERIPOL PP RP32ON and SR832M trade names (believed to have densities of 0.900 and 0.902, respectively, melting temperature of 145° C., and ethylene comonomer content of 3.5 wt. %), and under the ADSYL 5X37F trade name (believed to be a propylene/ethylenelbutene copolymer having a density of 0.900, a melting point of 132° C., and an ethylene comonomer content of 3.5 wt. %). Unless otherwise indicated, all densities herein are measured according to ASTM D 1505.

Exemplary homogenous PEC includes metallocene-catalyzed PECs available from Atofina/Total under the trade names EOD 0014 (believed to have a density of 0.905 g/cc, a melting temperature of 140° C., and an ethylene monomer content of 1.5 wt %), EOD 0017 (believed to have a density of 0.905 g/cc and a melting point of 140° C.), EOD 0103 (believed to have a density of 0.900 g/cc and a melting point of 134° C.), and EOD 0215 (believed to have a density of 0.895 g/cc and a melting temperature of 119° C.); from ExxonMobil under the VISTAMAXX VM1100 trade name (believed to have a density of 0.860 and an ethylene comonomer content of 13.4 wt. %); and from Basell under the CLYRELL SM1340 trade name (believed to have a melting point of 145° C. and an ethylene comonomer content of 4.4 wt. %).

Exemplary homogeneous PEC also includes those developmental performance plastomers available from The Dow Chemical Company, which are a family of specialty PECs having a narrow molecular weight distribution and broad crystallinity distribution. Dow publications report that VERSIFY PECs have the following properties: molecular weight distribution of 2 to 3; density of 0.858 to 0.888 g/cc; ethylene comonomer content of 5 to 15 wt. %; melting range from 50 to 135° C.; and glass transition temperature of −15 to −35° C. An exemplary Dow developmental PEC is a developmental performance plastomer under the trade name DP 3000, having a melting point of 112° C. and a density of 0.888 g/cc.

The intermediate layer may comprise one or more of any of the PECs described or characterized in this Application in at least about, and/or at most about, any of the following amounts: 10, 20, 30, 40, 45, 50, 55, 60, 65, 70, 75, 80, 85, 90, 95, and 100% by weight of the layer. The intermediate layer may consist essentially of, or may consist of, one or more propylene/ethylene copolymers.

The intermediate layer may comprise a first PEC in an amount of at least about, and/or at most about, any of the following: 40, 50, 60, 70, 80, 90, and 95%, based on the weight of the intermediate layer. The intermediate layer may comprise a second PEC in an amount of at least about, and/or at most about, any of the following: 5, 10, 15, 20, 25, 30, and 40%, based on the weight of the intermediate layer. The first and second PECs may each have melting points within any of the ranges described above for PEC. Further, the second PEC may have a melting point of at least about, and/or at most about, any of the following: 80, 85, 90, 95, 100, 105, and 110° C. The first PEC may have a melting point greater than the melting point of the second PEC by at least about, and/or at most about, any of the following: 10, 15, 20, 25, 30, 35, 40, 45, 50, 55, 60, 65, 70, and 75° C.

The intermediate layer may have a thickness of at least about, and/or at most about, any of the following: 0.05, 0.1, 0.3, 0.5, 1, 2, and 5 mils. The thickness of the intermediate layer as a percentage of the total thickness of the film may be at least about, and/or at most about, any of the following: 1, 3, 5, 7, 10, 15, 20, 30, 35, 40, 45, and 50 percent.

The intermediate layer may have a melting point of at least about, and/or at most about, any of the following: 100, 105, 110, 115, 120, 125, 130, 135, 140, 145, and 150° C. The melting point of the intermediate layer may be less than the melting point of the skin layer by at least about, and/or at most about, any of the following: 5, 10, 15, 20, 25, 30, 35, 40, 45, and 50° C.

Barrier Layer

The film may comprise a barrier layer comprising ethylene/vinyl alcohol copolymer ("EVOH") to markedly decrease the oxygen transmission rate through the barrier layer and thus the film incorporating the barrier layer. The film comprising a barrier layer may be incorporated in packaging to help exclude oxygen from the interior of the package—or to help maintain oxygen within the package.

The barrier layer may comprise EVOH in an amount of at least about, and/or at most about, any of the following: 40%, 50%, 60%, 70%, 80%, 90%, and 100%, based on the weight of the barrier layer. The film may be substantially devoid of EVOH.

Useful EVOH may have an ethylene content of at least about, and/or at most about, any of the following: 20, 25, 32, 35, 40, 42, 45, and 48 wt. %. EVOH may include saponified or hydrolyzed ethylene/vinyl acetate copolymers, such as those having a degree of hydrolysis of at least 50%, preferably of at least 85%. An exemplary EVOH is available from Noltex (joint venture of Nippon Gohsei and Mitsubishi Chemical) under the SOARNOL ET3803 trade name and believed to have an ethylene comonomer content of about 38 mole %.

The barrier layer may further comprise polyamide in at least about, and/or at most about, any of the following amounts: 5, 10, 15, 20, 25, 30, 35, 40, 50, and 60%, based on the weight of the barrier layer. Useful polyamide for inclusion in the barrier layer include one or more of any of the polyamides described or characterized in this Application.

The barrier layer thickness may be at least about, and/or at most about, any of the following: 0.05, 0.1, 0.2, 0.5, 1, 1.5, 2, 3, 4, 5, and 6 mils. The thickness of the barrier layer as a percentage of the total thickness of the film may be at least about, and/or at most about, any of the following: 1, 3, 5, 7, 10, 13, 15, 20, 25, 30, 35, 40, 45, and 50 percent.

First Polyamide Layer

The film may comprise a first polyamide layer comprising one or more polyamides. The first polyamide layer may be an interior layer of the film (i.e., a layer having both surfaces of the layer directly adhered to other layers of the film). Alternatively, the first polyamide layer may be an outer layer of the film (i.e., a layer forming an outer surface of the film). The first polyamide layer may be between the skin layer and the barrier layer. The first polyamide layer may be between the intermediate layer and the barrier layer. The first polyamide layer may be directly adhered to the barrier layer.

Exemplary polyamides include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

$H_2N(CH_2)_nNH_2$ where n has an integer value of 1 to 16. Representative examples include trimethylenediamine, tetramethylenediamine, pentamethylenediamine, 2-methylpentamethylenediamine ("MPMD"), hexamethylenediamine, 2,2,4-and 2,4,4-trimethylhexamethylenediamine ("TMD"), octamethylenediamine, decamethylenediamine, dodecamethylenediamine, hexadecamethylenediamine. Representative aromatic diamines include m-phenylenediamine ("MPD"), p-phenylenediamine ("PPD"), m-xylylenediamine ("MXD"), 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine and 2,4,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

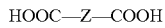

HOOC—Z—COOH where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid ("I") and terephthalic acid ("T").

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4,I"), polyhexamethylene isophthalamide ("nylon-6,I"), poly(trimethylhexamethylene terephthalamide) ("nylon-TMD,T"), poly(m-xylylene adipamide) ("nylon-MXD,6"), poly(p-xylylene adipamide), poly(hexamethylene terephthalamide), poly(dodecamethylene terephthalamide), and nylon-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly (10-aminodecanoic acid) ("nylon-10"), poly(11-aminoundecanoic acid) ("nylon-11"), and poly(12-aminododecanoic acid) ("nylon-12").

Exemplary nylon-6 is available from BASF Corporation under the ULTRAMID B50, B40 01, B40LN 01, B25, and B3 trade names and from Honeywell under the AEGIS H8202NLB and H73WP trade names.

Representative copolyamides include copolymers based on a combination of the monomers used to make any of the foregoing polyamides, such as, nylon-4/6, nylon-6/6, nylon-6/9, caprolactam/hexamethylene adipamide copolymer ("nylon-6/6,6"), hexamethylene adipamide/caprolactam copolymer ("nylon-6,6/6"), trimethylene adipamide/hexamethylene azelaiamide copolymer ("nylon-trimethyl 6,2/6,2"), hexamethylene adipamide-hexamnethylene-azelaiamide caprolactam copolymer ("nylon-6,6/6,9/6"), nylon-6/6,6/9, hexamethylene adipamide/hexamethylene-isophthalamide ("nylon-6,6/6,I"), hexamethylene adipamide/hexamethylene-terephthalamide ("nylon-6,6/6,T"), nylon-6,T/6,I, nylon-6/MXD,T/MXD,I, nylon-6,6/6,10, and hexamethylene isophthalamide/hexamethylene terephthalamide (nylon-6,I/6,T).

Exemplary copolyamides include nylon-6/6,6 available from BASF Corporation under the ULTRAMID C40 trade name (believed to have a density of 1.120 g/cc and a melting point of 190° C.), from Honeywell under the AEGIS HCA73QP trade name (believed to have a density of 1.130 and a melting point of 200° C.), and from UBE Corporation under the 5033B trade name (believed to have a melting point of 195° C.) and under the 5034B trade name (believed to have a melting point of 190° C.); nylon-6/12 available from EMS Corporation under the GRILON C6FS trade name (believed to have a melting point of 130° C.) and from UBE Corporation under the 7024B trade name (believed to have a melting point of 200° C.); and nylon-6/6,9 available from EMS Corporation under the GRILON BM13 SBG trade name (believed to have a melting point of 134° C.)

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from at least about, and/or at most about, any of the following: 50%, 60%, 70%, 80%, 90%, 95%, and 100%. Polyamide copolymers may include the second most prevalent polymer unit in the copolymer (e.g., caprolactam as a polymer unit in the copolymer nylon-6,6/6) in mole percentages ranging from at least about, and/or at most about, any of the following: 50%, 40%, 30%, 20%, and 10%.

Useful nylon-6/6,6 may comprise a nylon-6 (caprolactam) comonomer content of at least about, and/or at most about, any of the following: 10, 20, 25, 30, 35, 40, 45, 50, 60, 70, 75, 80, 85, 90, and 95 mole %.

The first polyamide layer may comprise one or more crystalline (i.e., semi-crystalline) polyamides. A "crystalline" polyamide displays a melting point, as distinguished from an "amorphous" polyamide, which does not clearly display a melting point. Exemplary crystalline polyamides include nylon-6; nylon-6,6; nylon-6,12; nylon-12; nylon-6,6/6.

The first polyamide layer may comprise polyamide having a melting point of at least about, and/or at most about, any of the following: 125, 130, 135, 140, 145, 150, 155, 160, 165, 170, 175, 180, 185, 190, 195, 200, 205, 210, 215, 220, and 225° C.

The first polyamide layer may comprise one or more amorphous polyamides in at least about, and/or at most about, any of the following amounts: 10, 20, 30, 40, 50, 60, 70, and 80%, based on the weight of the first polyamide layer. Exemplary amorphous polyamides include nylon-6,I/6,T (available from EMS Corporation under the GRIVORY G21 trade name); nylon-TMD,T (available from Degussa Corporation under the Trogamid T trademark), nylon-MXD,6/MXD,I (available from EMS Corporation under the GRILON FE4581 trade name), and nylon-6,I/6,9/6,6 (available from EMS Corporation under the GRIVORY FE4495 trade name). Alternatively, the first polyamide layer, and/or the film, may be substantially devoid of amorphous polyamide.

The first polyamide layer may comprise one or more of any of the above-described polyamides (e.g., nylon-6/6,6) and/or class of polyamides (e.g., crystalline polyamide and polyamide having a melting point of from about 125° C. to about 225° C.) in at least about, and/or at most about, any of the following amounts: 40, 50, 60, 70, 80, 90, 95, and 100%, based on the weight of the first polyamide layer.

The first polyamide layer may comprise a blend of polyamides. The first polyamide layer may comprise: 1) a primary polyamide comprising any of the polyamides described in this Application (e.g., nylon-6) in at least about, and/or at most about, any of the following amounts: 40, 50, 60, 70, 80, 90, 95, and 100%, based on the weight of the first polyamide layer; and 2) a secondary polyamide comprising any of the polyamides described in this Application (e.g., nylon-6/6,6) in at least about, and/or at most about, any of the following amounts: 5, 10, 15, 20, 25, 30, 35, 40, 45, and 50%, based on the weight of the first polyamide layer.

The first polyamide layer may have a melting point of at least about, and/or at most about, any of the following: 125, 130, 135, 140, 145, 150, 155, 160, 165, 170, 175, 180, 185, 190, 195, 200, 205, 210, 215, 220, and 225° C.

The first polyamide layer may have a thickness or at least about, and/or at most about, any of the following: 0.05, 0.1, 0.2, 0.5, 1, 1.5, 2, 3, 4, 5, and 6 mils. The thickness of the first polyamide layer as a percentage of the total thickness of the film may be at least about, and/or at most about, any of the following: 1, 3, 5, 7, 10, 15, 20, 25, 30, 35, 40, 45, and 50 percent.

Second Polyamide Layer

The film may comprise a second polyamide layer comprising one or more polyamides. The second polyamide layer may be an interior layer of the film. Alternatively, the second polyamide layer may be an outer layer of the film. The second polyamide layer may be between the barrier layer and the sealant layer (discussed below). The second polyarnide layer may be directly adhered to the barrier layer.

The composition, thickness, and melting point characteristics of the second polyamide layer may be any of those described above with respect to the first polyamide layer. Any of the composition, thickness, and melting point characteristics of the second polyamide layer may be substantially the same as any of those of the first polyamide layer or may differ from any of those of the first polyamide layer.

Sealant Layer

The film may comprise a sealant layer as an outer layer of the film. The sealant layer is adapted to facilitate the heat-sealing of the film to itself or to another object, such as a substrate (e.g., a lid). The sealant layer may form an outer surface of the film opposite the outer surface formed by the skin layer discussed above.

The sealant layer may comprise one or more thermoplastic polymers, for example, one or more of any of the following: polyolefins and ionomers.

Useful polyolefins include ethylene homo- and co-polymers and propylene homo-and co-polymers. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. The comonomer alpha-olefin may be selected from one or more of any of the $C_3$-$C_{20}$ α-olefins, such as the $C_4$-$C_{12}$ α-olefins, the $C_4$-$C_8$ α-olefins, 1-butene, 1-hexene, and 1-octene.

EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.920, 0.917, 0.915, 0.912, 0.910, 0.907, 0.905, 0.903, 0.900, and 0.898 grams/cubic centimeter. Unless otherwise indicated, all densities herein are measured according to ASTM D 1505.

The polyolefins may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the ExxonMobil Corporation (Baytown, Tex.) under the EXACT trademark (e.g., EXACT 3024 ethylene/butene copolymer) and EXCEED trademark (e.g., EXCEED 4518 PA ethylene/hexene copolymer), linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth)acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes any of the PECs discussed above with respect to the skin layer and the intermediate layer.

Ionomer is a copolymer of ethylene and an ethylenically unsaturated monocarboxylic acid having the carboxylic acid groups partially neutralized by a metal ion, such as sodium or zinc, preferably zinc. Useful ionomers include those in which sufficient metal ion is present to neutralize from about 15% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

The sealant layer may comprise at least about, and/or at most about, any one or more of the above-discussed polyolefins and ionomers in any of the following amounts: 30, 40, 45, 50, 55, 60, 65, 70, 75, 80, 85, 90, 95, and 100% by weight of the sealant layer.

The thickness of the sealant layer is selected to provide sufficient material to effect a strong heat seal bond, yet not so thick so as to negatively affect the manufacture (i.e., extrusion) of the sealant film by lowering the melt strength of the film to an unacceptable level. The sealant layer may have a thickness of at least about, and/or at most about, any of the following values: 0.05 mils, 0.1 mils, 0.2 mils, 0.25 mils, 0.3 mils, 0.35 mils, 0.4 mils, 0.45 mils, 0.5 mils, and 0.6 mils, 1 mil, 2 mils, 3 mils, 5 mils, and 6 mils. The thickness of the sealant layer as a percentage of the total thickness of the film may be at least about, and/or at most about, any of the following percentages: 1, 5, 10, 15, 20, 30, 35, 40, 45, and 50%.

The sealant layer may have a melting point of at least about, and/or at most about, any of the following: 130° C., 125° C., 120° C., 115° C., 112° C., 110° C., 108° C., 105° C., 103° C., 100° C., 98° C., and 95° C.

The sealant layer may have a Vicat softening temperature of less than about any of the following values: 120° C., 115° C., 110° C., 105° C., 100° C., 95° C., and 90° C. All references to "Vicat" values in this application are measured according to ASTM 1525 (1kg).

The sealant layer may comprise one or more polymers having a melt-flow index of at least about any of the following: 1, 1.2, 1.4, 1.6, 1.8, 2, 2.2., 2.5, 2.8, 3, 3.5, 4, 5, 6, 7, 8, 9, 10, 15, and 20. All references to melt-flow index in this application are measured according to ASTM D1238, at a temperature and piston weight as specified according to the material as set forth in the ASTM test method.

Tie Layers

The film may comprise one or more tie layers. A tie layer is a layer directly adhered (i.e., directly adjacent) to two layers on opposite sides of the tie layer, and has the primary function of improving the adherence of the two layers to each other. For example, the film may comprise a tie layer directly adhered both to: 1) either the skin layer or the intermediate layer and 2) the first polyamide layer or the barrier layer. The film may also comprise a tie layer directly adhered both to: 1) either the second polyamide layer or the barrier layer and 2) the sealant layer or the bulk layer (discussed below).

A tie layer of the film may comprise any of one or more of any of the tie polymers discussed below in at least about, and/or at most about, any of the following amounts: 40, 50, 60, 70, 80, 90, 95, and 100%, based on the weight of the tie layer.

Useful tie polymers include thermoplastic polymers that may be compatible both with polyolefin that may be present in one directly adjacent layer and with polymer having polar characteristics, such as EVOH or polyamide, that may be present in the other directly adhered layer. Such dual compatibility enhances the adhesion of the tied layers to each other.

Exemplary tie polymers include:
1. Ethylene/vinyl acetate copolymer (EVA), for example, having a vinyl acetate content of at least about, and/or at most about, any of the following weight % amounts: 3%, 5%, 10%, 15%, 20%, 22%, 24%, 25%, 28%, and 30%. EVA also includes, for example, ethylene/vinyl acetate/ carbon monoxide terpolymer, for example, having carbon monoxide content of at least about, and/or at most about, any of the following weight % amounts: 0.1%, 0.5%, 1%, 1.5%, 2%, 3%, 4%, and 5%, all based on the weight of the polymer.
2. Ethylene/(meth)acrylic acid copolymers (e.g., ethylene/ acrylic acid polymer, ethylene/methacrylic acid copolymer), such as any of those described elsewhere in this Application, for example, an ethylene/acrylic acid available from Dow Corporation under the PRIMACOR 1410 trademark and an ethylene/methylacrylate/acrylic acid terpolymer available from ExxonMobil under the Escor 310 and Escor 320 trademarks;
3. Ethylene/$C_1$-$C_{12}$ alkyl (meth)acrylate copolymers (e.g., ethylene/methyl acrylate copolymer, ethylene/butyl acrylate copolymer, ethylene/methyl methacrylate copolymer), such as any of those described elsewhere in this Application, for example, ethylene/methyl acrylate copolymer having a methyl acrylate content of at least about, and/or at most about, any of the following: 5, 10, 15, and 20 weight % (e.g., the resin available from the Eastman Chemical Company under the EMAC+SP1305 trademark), also for example, where the copolymer is a block copolymer comprising at least about 20 weight % (meth)acrylate monomer; and
4. Polymers modified (e.g., grafted) with unsaturated carboxylic acid anhydride (i.e., anhydride-modified polymer) to incorporate anhydride functionality, which promotes or enhances the adhesion characteristics of the polymer. Examples of unsaturated carboxylic acid anhydrides include maleic anhydride, fumaric anhydride, and unsaturated fused ring carboxylic acid anhydrides. Examples of anhydride-modified polymers include the anhydride-modified version of any of the polymers listed above in numbers 1-3 as well as any of the other polyolefins (e.g., ethylene homopolymer, ethylene/alpha-olefin copolymer, ethylene/unsaturated ester copolymer, ethylene/(meth)acrylic acid copolymer, propylene homopolymer, and propylene copolymer) described in this Application, thus including anhydride-modified ethylene homo- and co-polymers and propylene homo- and co-polymers.

Examples of anhydride-modified tie polymers also include: a) maleic anhydride-grafted linear low density polyethylene available from Rhom and Haas under the TYMOR 1228B trademark and from Equistar Division of Lyondell Corporation under the PX3236 trade name, b) maleic anhydride-grafted ethylene/vinyl acetate copolymer available from Dupont Corporation under the BYNEL 3861 trademark, c) maleic anhydride-grafted polypropylene available from Mitsui Petrochemical Corp (Tokyo, Japan) under the ADMER QB 510A trade name, d) PLEXAR 360 RESIN (Quantum Co.; Cincinnati, Ohio), and e) the LOTADER series of ethylene/alkyl acrylate/maleic anhydride interpolymers (Elf-Atochem, Inc.; Buffalo, N.Y). The anhydride-modified polymer may be made by grafting or copolymerization.

Useful anhydride-modified polymers may contain anhydride moiety in an amount (based on the weight of the modified polymer) of at least about, and/or at most about, any of the following: 0.1%, 0.5%, 1%, 2%, 4%, 5%, 8%, and 10%.

Any of the one or more tie layers may have a melting point of at least about, and/or at most about, any of the following: 100, 110, 115, 120, 125, 130, and 135° C. The tie layer may have a melting point within any of the following degrees of the melting point of both of the directly adjacent layers: 5, 10, 15, 20, 25, 30, and 40° C.

Any of the one or more tie layers may have a thickness of at least about, and/or at most about, any of the following: 0.05 mils, 0.1 mils, 0.2 mils, 0.25 mils, 0.3 mils, 0.35 mils, 0.4 mils, 0.45 mils, 0.5 mils, and 0.6 mils, 1 mil, and 2 mils. The thickness of a tie layer as a percentage of the total thickness of the film may be at least about, and/or at most about, any of the following percentages: 1, 5, 10, 15, 20, and 30%.

Bulk Layer

The film may comprise one or more bulk layers. A bulk layer is an interior layer of the film and may serve to enhance the strength, modulus, and/or optics of the film. A bulk layer may have a primary purpose other than as a barrier or tie layer. A bulk layer may comprise one or more of any of the polymers and/or have any of the compositions as described above in the Sealant Layer section with respect to the sealant layer. A bulk layer may be between a barrier layer and a sealant layer.

A bulk layer may have a thickness of at least about, and/or at most about, any of the following: 0.5, 1, 2, 3, 4, and 5 mils. The thickness of a bulk layer as a percentage of the total thickness of the film may be at least about, and/or at most about, any of the following percentages: 10, 15, 20, 30, 40, 50, and 60%.

Addititives

One or more layers of the film may include one or more additives useful in thermoplastic films, such as, antiblocking agents, slip agents, antifog agents, colorants, pigments, dyes, flavorants, antimicrobial agents, meat preservatives, antioxidants, fillers, radiation stabilizers, and antistatic agents.

Modulus and Elasticity of the Film

The film preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. The film may have a Young's modulus—measured either before and/or after the forming step—of at least about, and/or at most about—any of the following: 10,000; 15,000; 25,000; 40,000; 70,000; 80,000; 90,000; 100,000; 150,000; 200,000; 250,000; 300,000; and 350,000 pounds/square inch, measured at a temperature of 73° F.

Appearance Characteristics of the Film

The film may have low haze characteristics. Haze is a measurement of the transmitted light scattered more than 2.5° from the axis of the incident light. Unless otherwise noted, haze is measured against the outside layer of the film. The "outside layer" is the outer layer of the film that is or is intended to be adjacent the space outside of a package comprising the film. (The "inside layer" of a film is the outer layer of the film that is or is intended to be adjacent the space inside of a package comprising the film.) Haze is measured according to the method of ASTM D 1003, which is incorporated herein in its entirety by reference. All references to a "haze" value for a film in this application are by this standard. The haze of the film—measured at a time selected from before the forming step or after the forming step—may be at most about any of the following values: 30%, 25%, 20%, 15%, 10%, 8%, 5%, and 3%.

The film may have a gloss (i.e., specular gloss) as measured against the outside layer—measured at a time selected from before the forming step or after the forming step—of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The regular transmittance (i.e., clarity) of the film—measured at a time selected from before the forming step or after the forming step—may be at least about any of the following values: 65%, 70%, 75%, 80%, 85%, and 90%, measured in accordance with ASTM D1746. All references to "regular transmittance" values in this application are by this standard.

The total luminous transmittance (i.e., total transmittance) of the film—measured at a time selected from before the forming step or after the forming step—may be at least about any of the following values: 65%, 70%, 75%, 80%, 85%, and 90%, measured in accordance with ASTM D1003. All references to "total luminous transmittance" values in this application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

Manufacture of the Film

The film may be manufactured by thermoplastic film-forming processes known in the art. The film may be prepared by extrusion or coextrusion utilizing, for example, a tubular trapped bubble film process, a flat or tube cast film process, or a slit die flat cast film process. The film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) but at a temperature below the film's melting point. The film may then be quickly cooled to retain the physical properties generated during orientation and to provide a heat-shrink characteristic to the film. The film may be oriented using, for example, a tenter-frame process or a bubble process. The orientation may occur in at least one direction by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1.

Alternatively, the film may be "non-oriented"—that is, the film may not be subjected to an orientation step by the time of the beginning of the forming step.

The film may have a free shrink at 185° F. (85° C.) in at least one direction (e.g., the machine direction or the transverse direction) and/or in both the machine and transverse directions of at least about, and/or at most about, any of the following: 5%, 7%, 9%, 10%, 12%, 15%, 25%, 30%, 40%, 45%, 50%, 55%, 60%, 70%, and 80%. The film may be annealed or heat-set to slightly or substantially reduce the free shrink of an oriented film. The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard.

Thermoforming the Film

The provided film may be heated before the forming step in order to cause the film to become more pliant (e.g., heat-softened) for the subsequent forming step. The film may be heated to a film thermoforming temperature of at least about, and/or at most about, any of the following temperatures: 45, 50, 55, 60, 65, 70, 80, 90, 95, 100, 105, and 110° C. The film may be heated by exposure to, or use of, one or more of a water bath, hot air tunnel, or infrared radiation heaters.

Subsequent to the heating step, the film may be formed (i.e., thermoformed) to change the shape of the film to a desired shape, for example, by pulling the heated film down onto a mold surface. The film may be formed, for example, by the use of any of one or more of vacuum forming, air assist vacuum forming, plug assist vacuum forming, and drape forming. An exemplary thermoforming equipment is the Cryovac MULTIVAC R530 thermoforming machine.

The resulting formed web may be shaped to the configuration of a packaging component, for example, such as any of a tray or a formed pocket useful, for example, in a horizontal form, fill, seal (HFFS) application. In doing so, the film may be deep drawn (i.e., extended into a mold having a depth of at least about, and/or at most about, any of the following: 2, 3, and 4 inches.

A food product (e.g., meat, such as red meat, chicken, pork, soup, sauces, pasta) may be placed in or on the formed web packaging component. A lid or other closure may be sealed to the formed web to enclose the food product within a package and create a packaged food. It is possible for the formed web to be sealed to itself to close the package.

The following examples are presented for the purpose of further illustrating and explaining some embodiments of the present invention and are not to be taken as limiting in any regard. Unless otherwise indicated, all parts and percentages are by weight.

The following abbreviations are used in the Examples:

PEC1 is homogeneous random propylene/ethylene copolymer available from Atofina/Total Corporation under the EOD 0014 trade name, and is believed to have an ethylene monomer content of about 1.5 wt %, a density of 0.905 g/cc, and a melting temperature of 140° C.

PEC2 is a propylene/ethylene copolymer available from The Dow Chemical Company under the designation DP3000, believed to have a density of about 0.888 g/cc and a melting point of about 112° C.

PEC3 is homogenous random propylene/ethylene copolymer available from Basell Corporation under the SM1340 trade name, believed to have an ethylene monomer content of about 4.4 wt % and a melting point of about 145° C.

PEC4 is homogenous random propylene/ethylene copolymer available from Atofina/Total Corporation under the EOD 0215 trade name, believed to have an ethylene content of about 3 wt %, a density of 0.895 g/cc and a melting point of about 119° C.

PEC5 is homogenous random propylene/ethylene copolymer available from ExxonMobil Corporation under the VISTAMAXX 1100 trade name, believed to have an ethylene monomer content of about 13.4 wt % and a melt index (230° C./2.16 kg (L))of 4.0 g/10 minutes.

mod-LLDPE is maleic anhydride modified linear low density polyethylene available from the Equistar Division of Lyondell Corporation under the EX3236 trade name.

PA1 is nylon-6/6,6 available from BASF Corporation under the ULTRAMID C40 trade name, and is believed to have a nylon-6 comonomer content of about 80.7 wt %, a nylon-6,6 comonomer content of about 19.3 wt %, a density of 1.120 g/cc, and a melting point of 190° C.

PA2 is nylon-6 available from BASF Corporation under the ULTRAMID B40 01 trade name, and is believed to have a density of 1.130 g/cc and a melting point of 220° C.

EVOH is ethylene/vinyl alcohol copolymer available from Noltex (joint venture of Nippon Gohsei and Mitsubishi Chemical) under the SOARNOL ET3803 trade name and believed to have an ethylene comonomer content of about 38 mole %.

LLDPE is a homogeneous linear low density polyethylene (ethylene/hexene copolymer) available from ExxonMobil Corporation under the EXCEED 4518PA trade name, believed to have a density of about 0.918 to 0.920 and a melting temperature of about 115° C.

LDPE is a low density polyethylene available from ExxonMobil Corporation under the ESCORENE trade name, believed to have a melting temperature of about 104° C.

VLDPE is a homogeneous very low density polyethylene (ethylene/butene copolymer) available from ExxonMobil Corporation under the EXACT 3024 trade name, believed to have a density of about 0.904 to 0.906 and a melting temperature of about 98° C.

MB1 is a masterbatch of antiblock and slip agents in a linear low density polyethylene matrix available from Ingenia Polymers under the IP11070 trade name.

The formability of the films below was evaluated at film thermoforming temperatures ranging from 45° C. to 100° C. using a Multivac R530 horizontal rollstock thermoforming packaging machine having a mold configuration of a 122 mm deep pocket. The degree to which the films well-conformed to the corners and bottom of the mold to form a distinct pocket was evaluated, as well as the extent to which the films may have "bridged" the corners. The "lower thermoforming temperature" was determined by the lowest film thermoforming temperature at which the thermoformed film consistently formed a distinct pocket maintaining the 122 mm forming depth without blowout. The "upper thermoforming temperature" was determined by the highest film thermoforming temperature (up to 100° C.) at which the thermoformed film consistently formed a distinct pocket maintaining the 122 mm forming depth without blowout.

EXAMPLE 1

An eight mil thick film (Example 1) (NLX-0748) having the structure shown in Table 1 was coextruded as a downwardly cast tube.

TABLE 1

| Layer | Description | Composition | Thickness (% of total) |
|---|---|---|---|
| 1 | skin | PEC1 | 8 |
| 2 | intermediate | PEC2 | 16 |
| 3 | tie | mod-LLDPE | 7 |
| 4 | first polyamide | PA1 | 13 |
| 5 | barrier | EVOH | 10 |
| 6 | second polyamide | PA1 | 13 |
| 7 | tie | mod-LLDPE | 8 |
| 8 | bulk | LLDPE 90% LDPE 10% | 17 |
| 9 | sealant | VLDPE 97% MB1 3% | 8 |

The Example 1 film had a haze of 3.66%, a clarity of 96.90%, a total transmission of 92.33%, a lower thermoforning temperature of 50° C., an upper thermoforming temperature of 100° C., a machine direction modulus of 86,500 psi, and a transverse direction modulus of 91,400 psi.

EXAMPLE 2

An eight mil thick film (Example 2) (NLX-0845) was made in the same manner and having the same structure as the Example 1 film, except that the fourth and sixth layers were each made of 30 wt % PA1 and 70 wt % PA2.

The Example 2 film had a haze of 2.48%, a clarity of 96.7%, a total transmission of 91.8%, a lower thermoforming temperature of 53° C., an upper thermoforming temperature of 100° C., a machine direction modulus of 99,900 psi, and a transverse direction modulus of 96,900 psi.

EXAMPLE 3

An eight mil thick film (Example 3) (NLX-0940) was made in the same manner and having the same structure as the Example 1 film, except that the second layer was made of PEC3.

The Example 3 film had a haze of 2.57%, a clarity of 96.5%, a total transmission of 91.9%, a lower thermoforming temperature of 55° C., and an upper thermoforming temperature of 100° C.

EXAMPLE 4

An eight mil thick film (Example 4) (NLX-0997) was made in the same manner and having the same structure as the Example 1 film, except that the second layer was made of 80 wt % PEC4 and 20 wt % PEC5.

The Example 4 film had a haze of 4.36%, a clarity of 96.3%, a total transmission of 92.6%, a lower thermoforming temperature of 57° C., and an upper thermoforming temperature of 100° C.

EXAMPLE 5

An eight mil thick film (Example 5) (NLX-1007) was made in the same manner and having the same structure as the Example 1 film, except that the second layer was made of 90 wt % PEC4 and 10 wt % PEC5. The Example 5 film had a haze of 4.84%, a clarity of 96.4%, a total transmission of 92.6%, a lower thermoforming temperature of 55° C., and an upper thermoforming temperature of 100° C.

EXAMPLE 6

An eight mil thick film (Example 6) (NLX-0996) was made in the same manner and having the same structure as the Example 1 film, except that the second layer was made of PEC4. The Example 6 film had a haze of 4.25%, a clarity of 96.5%, a total transmission of 92.3%, a lower thermoforming temperature of 55° C., and an upper thermoforming temperature of 100° C.

EXAMPLE 7

An eight mil thick film (Example 7) (NLX-1008) was made in the same manner and having the same structure as the Example 1 film, except that the second layer was made of 80 wt % PEC1 and 20 wt % PEC5. The Example 7 film had a haze of 4.84%, a clarity of 96.2%, a total transmission of 92.6%, a lower thermoforming temperature of 57° C., and an upper thermoforming temperature of 100° C.

EXAMPLE 8

An eight mil thick film (Example 8) (NLX-1009) was made in the same manner and having the same structure as the Example 1 film, except that the second layer was made of 80 wt % PEC3 and 20 wt % PEC5. The Example 8 film had a haze of 4.28%, a clarity of 97.0%, a total transmission of 92.6%, a lower thermoforming temperature of 57° C., and an upper thermoforming temperature of 100° C.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A method of thermoforming comprising the steps of:
   (1) providing a film comprising:
      (i) a skin layer forming an outer surface of the film, wherein:
         the skin layer has a melting point of at least about 130° C. and at most about 150° C.; and
         the skin layer comprises one or more propylene/ethylene copolymers; and
      (ii) a first polyamide layer forming an interior layer of the film, wherein:
         the first polyamide layer has a melting point of at least about 125° C. and at most about 230° C.; and
         the first polyamide layer comprises one or more polyamides;
      (iii) an intermediate layer between the skin layer and the first polyamide layer, wherein:
         the intermediate layer has a melting point of at least about 105° C. and at most about 150° C.; and
         the intermediate layer comprises one or more propylene/ethylene copolymers;
      (iv) a sealant layer forming an outer layer of the film, wherein the sealant layer has a melting point of at most about 130° C.;
      (v) a barrier layer comprising ethylene/vinyl alcohol copolymer, wherein the barrier layer is directly adjacent the first polyamide layer;
      (vi) a second polyamide layer directly adjacent the barrier layer and comprising one or more polyamides; and
      (vii) a tie layer between the intermediate layer and the first polyamide layer, the tie layer comprising one or more tie polymers;
   (2) heating the film; and
   (3) thermoforming the heated film onto a mold having a mold depth of at least about 2 inches.

2. The method of claim 1 wherein the skin layer has a melting point of at most about 145° C.

3. The method of claim 1 wherein the skin layer has a melting point of at most about 140° C.

4. The method of claim 1 wherein the skin layer comprises at least about 50%, by weight of the layer, of propylene/ethylene copolymer having an ethylene comonomer content of at least about 1 wt % and at most about 10 wt %.

5. The method of claim 1 wherein the skin layer comprises at least about 50%, by weight of the layer, of propylene/ethylene copolymer having an ethylene comonomer content of at least about 3 wt % and at most about 8 wt %.

6. The method of claim 1 wherein the skin layer comprises at least about 50%, by weight of the layer, of propylene/ethylene copolymer having a melting point of at least about 130° C. and at most about 145° C.

7. The method of claim 1 wherein the skin layer comprises one or more homogeneous propylene/ethylene copolymers.

8. The method of claim 1 wherein the skin layer comprises one or more random propylene/ethylene copolymers.

9. The method of claim 1 wherein the thickness of the skin layer is at least about 5% and at most about 25% of the total thickness of the film of the providing step.

10. The method of claim 1 wherein the first polyamide layer has a melting point of at most about 210° C.

11. The method of claim 1 wherein the first polyamide layer has a melting point of at most about 200° C.

12. The method of claim 1 wherein the first polyamide layer has a melting point of at least about 170° C.

13. The method of claim 1 wherein the first polyamide layer comprises at least about 20%, by weight of the layer, of nylon-6/6,6.

14. The method of claim 1 wherein the first polyamide layer comprises at least about 90%, by weight of the layer, of nylon-6/6,6.

15. The method of claim 1 wherein the first polyamide layer comprises at least about 30%, by weight of the layer, of nylon-6/6,6 having a melting point of at least about 180° C. and at most about 195° C.

16. The method of claim 1 wherein the first polyamide layer comprises at least about 50%, by weight of the layer, of nylon-6/6,6 having a caprolactam comonomer content range selected from: 1) at least about 30 mole % to at most about 35 mole % and 2) at least about 85 mole % to at most about 90 mole %.

17. The method of claim 1 wherein the first polyamide layer comprises from about 1 to about 80%, by weight of the layer, of one or more amorphous polyamides.

18. The method of claim 1 wherein the first polyamide layer comprises at most about 5%, by weight of the layer, of amorphous polyamide.

19. The method of claim 1 wherein the first polyamide layer is substantially free of amorphous polyamide.

20. The method of claim 1 wherein the thickness of the first polyamide layer is at least about 5% and at most about 25% of the total thickness of the film of the providing step.

21. The method of claim 1 wherein the barrier layer comprises at least about 80%, by weight of the layer, of ethylene/vinyl alcohol copolymer.

22. The method of claim 1 wherein the barrier layer has a thickness that is at least about 5% and at most about 20% of the total thickness of the film of the providing step.

23. The method of claim 1 wherein the second polyamide layer has a melting point of at most about 210° C.

24. The method of claim 1 wherein the second polyamide layer has a melting point of at most about 200° C.

25. The method of claim 1 wherein the second polyamide layer has a melting point of at least about 170° C.

26. The method of claim 1 wherein the second polyamide layer comprises at least about 20%, by weight of the layer, of nylon-6/6,6.

27. The method of claim 1 wherein the second polyamide layer comprises at least about 90%, by weight of the layer, of nylon-6/6,6.

28. The method of claim 1 wherein the second polyamide layer comprises at least about 50%, by weight of the layer, of nylon-6/6,6 having a melting point of at least about 180° C. and at most about 195° C.

29. The method of claim 1 wherein the second polyamide layer comprises at least about 50%, by weight of the layer, of nylon-6/6,6 having a nylon-6 comonomer content range selected from: 1) at least about 30 mole % to at most about 35 mole % and 2) at least about 85 mole % to at most about 90 mole %.

30. The method of claim 1 wherein the second polyamide layer comprises from about 1 to about 80%, by weight of the layer, of one or more amorphous polyamides.

31. The method of claim 1 wherein the second polyamide layer comprises at most about 5%, by weight of the layer, of amorphous polyamide.

32. The method of claim 1 wherein the second polyamide layer is substantially free of amorphous polyamide.

33. The method of claim 1 wherein the thickness of the second polyamide layer is at least about 10% and at most about 20% of the total thickness of the film of the providing step.

34. The method of claim 1 wherein:
the first polyamide layer comprises at least about 50%, by weight of the layer, of Nylon-6/6,6; and
the second polyamide layer comprises at least about 50%, by weight of the layer, of nylon-6/6,6.

35. The method of claim 34 wherein the nylon-6/6,6 of the first and second polyamide layers are substantially the same.

36. The method of claim 1 wherein the intermediate layer is directly adjacent the skin layer.

37. The method of claim 36 wherein the intermediate layer has a melting point of at most about 130° C.

38. The method of claim 36 wherein the intermediate layer has a melting point of at most about 120° C.

39. The method of claim 36 wherein the intermediate layer has a melting point of at most about 115° C.

40. The method of claim 36 wherein the intermediate layer comprises at least about 50%, by weight of the layer, of propylene/ethylene copolymer having an ethylene content of at least about 1 wt % and at most about 10 wt %.

41. The method of claim 36 wherein the intermediate layer comprises at least about 50%, by weight of the layer, of propylene/ethylene copolymer having an ethylene content of at least about 3 wt % and at most about 8 wt %.

42. The method of claim 36 wherein the intermediate layer comprises at least about 50%, by weight of the layer, of propylene/ethylene copolymer having a melting point of at least about 105° C. and at most about 130° C.

43. The method of claim 36 wherein the intermediate layer comprises at least about 50%, by weight of the layer, of propylene/ethylene copolymer having a melting point of at least about 105° C. and at most about 120° C.

44. The method of claim 36 wherein the intermediate layer comprises one or more homogenous propylene/ethylene copolymers.

45. The method of claim 36 wherein the intermediate layer comprises one or more random propylene/ethylene copolymers.

46. The method of claim 36 wherein the intermediate layer comprises:
at least about 40%, by weight of the layer, of a first propylene/ethylene copolymer having a melting point of at least about 110° C.; and
at least about 10%, by weight of the layer, of a second propylene/ethylene copolymer having a melting point of at most about 110° C.

47. The method of claim 46 wherein the first propylene/ethylene copolymer has a melting point of at least about 115° C. and the second propylene/ethylene copolymer has a melting point of at most about 100° C.

48. The method of claim 46 wherein at least one of the first and second propylene/ethylene copolymers is a homogeneous propylene/ethylene copolymer.

49. The method of claim 1 wherein the intermediate layer comprises at least about 50 weight %, by weight of the intermediate layer, of propylene/ethylene copolymer having a density of at least about 0.860 and at most about 0.905.

50. The method of claim 1 wherein the film of the providing step has not been oriented and the film has a thickness of at most about 10 mils.

51. The method of claim 1 wherein the film of the providing step has not been oriented and the film has a thickness of at most about 6 mils.

52. The method of claim 1 wherein the film is substantially free of polyester.

53. The method of claim 1 wherein the film of the providing step has a Young's modulus of at most about 120,000 psi at 50° C., measured according to ASTM D882.

54. The method of claim 1 wherein the total luminous transmittance of the film of the providing step is at least about 95%, measured according to ASTM D1003.

55. The method of claim 1 wherein the heating step heats the film to a temperature of at least about 45° C.

56. The method of claim 1 wherein the heating step heats the film to a temperature of at most about 105° C.

57. The method of claim 1 wherein the heating step heats the film to a temperature of at most about 60° C.

58. The method of claim 1 wherein the thermoforming step comprises vacuum forming.

59. The method of claim 1 wherein the thermoforming step comprises plug assist vacuum forming.

60. The method of claim 1 wherein the thermoforming step comprises air assist vacuum forming.

61. The method of claim 1 wherein:
the film of the providing step is non-oriented and has a thickness of at most about 12 mils;
the skin layer comprises at least about 50%, by weight of the layer, of one or more propylene/ethylene copolymers having a melting point of at least about 130° C. and at most about 150° C.; and
the first polyamide layer comprises at least about 50%, by weight of the layer, of one or more polyamides having a melting point of at least about 125° C. and at most about 230° C.; and
the intermediate layer is directly adjacent the skin layer, wherein the intermediate layer comprises at least about 50%, by weight of the layer, of one or more propylene/ethylene copolymers having a melting point of at least about 105° C. and at most about 150° C.;
the second polyamide layer comprises at least about 50%, by weight of the layer, of one or more polyamides having a melting point of at least about 125° C. and at most about 230° C.; and
the heating step heats the film to a temperature of at least about 45° C. and at most about 105° C.

62. The method of claim 61 wherein the first polyamide layer comprises at least about 50%, by weight of the layer, of nylon-6/6,6 and the second polyamide layer comprises at least about 50%, by weight of the layer, of nylon-6/6,6.

63. The method of claim 61 wherein the film further comprises a tie layer directly adjacent to both the intermediate layer and the first polyamide layer, wherein the tie layer comprises at least about 50%, by weight of the layer, of a modified polyethylene polymer.

64. The method of claim 1 wherein the sealant layer has a melting point of at most about 125° C.

65. The method of claim 1 wherein in the tie layer comprises at least 40% by weight of the tie layer of one or more tie polymers selected from ethylene/vinyl acetate copolymer, ethylene/(meth)acrylic acid copolymers, ethylene/$C_1$-$C_{12}$ alkyl (meth)acrylate copolymers, and anhydride-modified polymers.

* * * * *